US010669163B2

(12) United States Patent
Swain et al.

(10) Patent No.: US 10,669,163 B2
(45) Date of Patent: Jun. 2, 2020

(54) UNIVERSAL FILTER CARTRIDGE

(71) Applicant: Paragon Water Systems, Inc., Clearwater, FL (US)

(72) Inventors: David Swain, Tarpon Springs, FL (US); Shangfu Ma, Xiamen (CN)

(73) Assignee: PARAGON WATER SYSTEMS, Clearwater, FL (US)

(*) Notice: Subject to any disclaimer, the term of this patent is extended or adjusted under 35 U.S.C. 154(b) by 774 days.

(21) Appl. No.: 13/659,400

(22) Filed: Oct. 24, 2012

(65) Prior Publication Data

US 2014/0110325 A1    Apr. 24, 2014

(51) Int. Cl.
C02F 1/00     (2006.01)
C02F 1/28     (2006.01)

(52) U.S. Cl.
CPC .............. *C02F 1/003* (2013.01); *C02F 1/283* (2013.01); *C02F 2201/006* (2013.01)

(58) Field of Classification Search
CPC .. C02F 1/00; C02F 1/001; C02F 1/003; C02F 1/006; C02F 1/008; C02F 1/28; C02F 1/32; C02F 1/42; C02F 1/283; C02F 1/441; C02F 1/685; C02F 1/688; C02F 1/766; C02F 9/005; C02F 2201/002; C02F 2201/006; C02F 2201/445; C02F 2303/14; C02F 2307/04; B01D 24/04; B01D 24/042; B01D 27/08; B01D 35/02; B01D 35/30; B01D 36/001; B01D 37/04; B01D 61/08; B01D 2201/30; B01D 2201/301; B01J 47/002
USPC ....... 210/232, 282, 472, 473, 484, 236, 244, 210/266, 477, 455, 464, 474, 475, 120, 210/238, 451, 470, 476, 498, 501, 502.1, 210/503, 510.1; D7/316–319, 392
See application file for complete search history.

(56) References Cited

U.S. PATENT DOCUMENTS

| | | | |
|---|---|---|---|
| 3,747,767 A * | 7/1973 | Hankammer | B01D 35/28 210/282 |
| 4,969,996 A * | 11/1990 | Hankammer | B01D 36/001 210/282 |
| 5,190,643 A | 3/1993 | Duncan et al. | |
| 5,665,224 A | 9/1997 | Levene et al. | |
| 5,785,844 A | 7/1998 | Lund et al. | |
| 5,811,004 A * | 9/1998 | Robertson et al. | 210/482 |
| 5,851,388 A * | 12/1998 | Suh | B01D 61/08 210/257.2 |
| 5,873,995 A | 2/1999 | Huang et al. | |
| 5,882,507 A | 3/1999 | Tanner et al. | |
| 5,888,381 A * | 3/1999 | Primdahl | B01D 61/18 200/81.9 M |
| 5,900,138 A | 5/1999 | Moretto | |

(Continued)

FOREIGN PATENT DOCUMENTS

WO    WO 9805401 A1 *  2/1998 ......... B01D 39/1623

Primary Examiner — Krishnan S Menon
Assistant Examiner — Brad Gordon
(74) Attorney, Agent, or Firm — Greer, Burns & Crain, Ltd.

(57) ABSTRACT

A water filter cartridge is provided, including a body for receiving a supply of filter media, the body having an open upper end and an outlet having a plurality of outlet openings, and a cap configured for sealingly engaging the upper end of the body. The supply of media directly contacts an inside surface of an outlet of the body, and the outlet openings being dimensioned for retaining the media despite direct contact with the inside surface.

14 Claims, 4 Drawing Sheets

(56) References Cited

U.S. PATENT DOCUMENTS

| | | | |
|---|---|---|---|
| D415,922 S | 11/1999 | Kawasaki et al. | |
| D419,027 S | 1/2000 | Haslem et al. | |
| 6,074,550 A | 6/2000 | Hofmann et al. | |
| D459,941 S | 7/2002 | Miller | |
| 6,524,477 B1 * | 2/2003 | Hughes | C02F 1/003 210/282 |
| 6,649,045 B2 | 11/2003 | Tanner et al. | |
| 6,881,327 B2 | 4/2005 | Tanner et al. | |
| 6,953,523 B2 | 10/2005 | Vandenbelt et al. | |
| D520,597 S | 5/2006 | Witte | |
| 7,107,838 B2 | 9/2006 | Chai et al. | |
| 7,201,840 B2 | 4/2007 | Tsataros et al. | |
| D546,113 S | 7/2007 | Ruoff | |
| 8,167,141 B2 * | 5/2012 | Knipmeyer | B01D 39/2062 210/266 |
| 2003/0034283 A1 | 2/2003 | Tsataros et al. | |
| 2004/0173507 A1 * | 9/2004 | Tanner | C02F 1/003 210/85 |
| 2005/0077246 A1 * | 4/2005 | Pardini | B01D 15/00 210/724 |
| 2009/0001011 A1 * | 1/2009 | Knipmeyer | B01D 39/2062 210/266 |
| 2013/0199974 A1 * | 8/2013 | Shmidt | C02F 1/003 210/104 |

* cited by examiner

U S 10,669,163 B2

UNIVERSAL FILTER CARTRIDGE

BACKGROUND

The present invention relates generally to drinking water filtration systems, and particularly to cartridges used in water pitcher filtration units.

Conventional water pitcher filtration units include a pitcher dimensioned for retaining a supply of filtered water, and a funnel disposed within and suspended from an upper end of the pitcher. The funnel defines a volume within the pitcher, into which untreated potable water is poured by the user. A filter cartridge is situated within the funnel, typically at a lowest point to receive water through a cartridge inlet. The cartridge contains a filter media, typically activated carbon and other additives well known in the art. After treatment in the cartridge through gravity flow, the water exits a cartridge outlet and flows into the pitcher volume. The user accesses the pitcher volume for obtaining treated water.

One drawback of conventional pitcher filters is that particles of filter media often escape through openings in the outlet. This is undesirable from the consumer standpoint, since the water appears contaminated. Manufacturers of such cartridges typically address this problem by adding a mesh screen at the base of the cartridge housing near the outlet so that particles of filter media cannot easily escape into the filter volume. However, the inclusion of the screen adds manufacturing material and labor costs.

Another drawback of conventional pitcher filter cartridges is that filter media also may escape through water inlet openings in the upper end of the cartridge. Manufacturers in some cases add screens for preventing this escape, however for many models of conventional cartridges, this unsightly escape of media is still a problem.

Yet another drawback of conventional pitcher filter cartridges is that manufacturing costs are generally considered excessive and should be reduced where possible.

SUMMARY

The above-identified needs are met by the present water filter cartridge, which is configured for providing filter performance comparable to conventional cartridges, while having a design that is less costly to provide and assemble. Also, the present cartridge is configured for being accommodated in a variety of pitcher funnels of various manufacturers. Due to coordination between filter media particle size and the cartridge outlet opening size, the escape of media particles is prevented without the use of a screen. In addition, a cap portion of the cartridge housing is secured to a body portion of the housing solely by a snap-fit engagement, without the conventional requirement for sonic welding or chemical adhesives. Another feature of the present cartridge is that the cap has inlet openings constructed and arranged for facilitating gripping by the user. Still another feature of the present cartridge is that a radially projecting flange on an upper portion of the cartridge body has an enhanced profile for more positively engaging a corresponding opening in the funnel in which the cartridge seats for operation. The present flange is also configured for more efficient molding during production. A still further feature of the present cartridge is that a locating groove on the cartridge body extends from a bottom to a top of the body.

More specifically, a water filter cartridge is provided, including a body for receiving a supply of filter media, the body having an open upper end and an outlet having a plurality of outlet openings, and a cap configured for sealingly engaging the body upper end. The supply of media directly contacts an inside surface of an outlet of the body, and the outlet openings are dimensioned for retaining the media despite direct contact with the inside surface.

In another embodiment, a water filter cartridge is provided, including a body for receiving a supply of filter media, the body having an open upper end and an outlet having a plurality of outlet openings, and a cap configured for sealingly engaging an upper end of the body. The cap having a plurality of water inlet openings, at least one vent opening, and being secured to the body solely by a snap fit connection.

In yet another embodiment, a water filter cartridge is provided, including a body for receiving a supply of filter media, the body having an open upper end and an outlet having a plurality of outlet openings, and a cap configured for sealingly engaging an upper end of the body, the cap having a plurality of water inlet openings, and at least one vent opening. A seal flange radially projects from an upper end of the body, the seal flange defining an inverted "U"-shape with the body and having parallel inside surfaces defining the "U"-shape, and having an angular lobe on an exterior surface of the flange.

DETAILED DESCRIPTION

Figure 1:
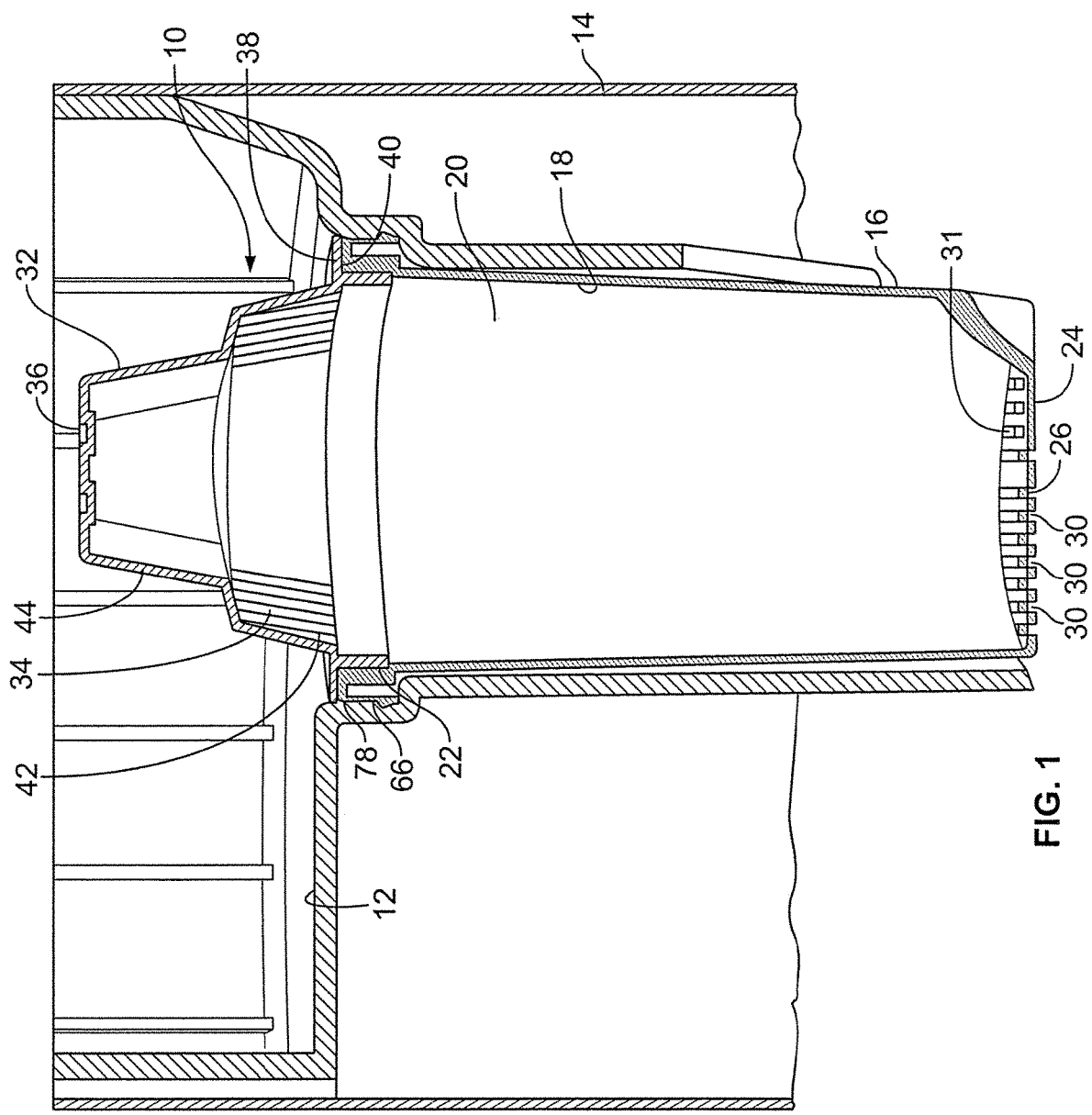
FIG. 1 is a fragmentary vertical cross-section of the present cartridge shown mounted in a pitcher funnel.
Figure 2:
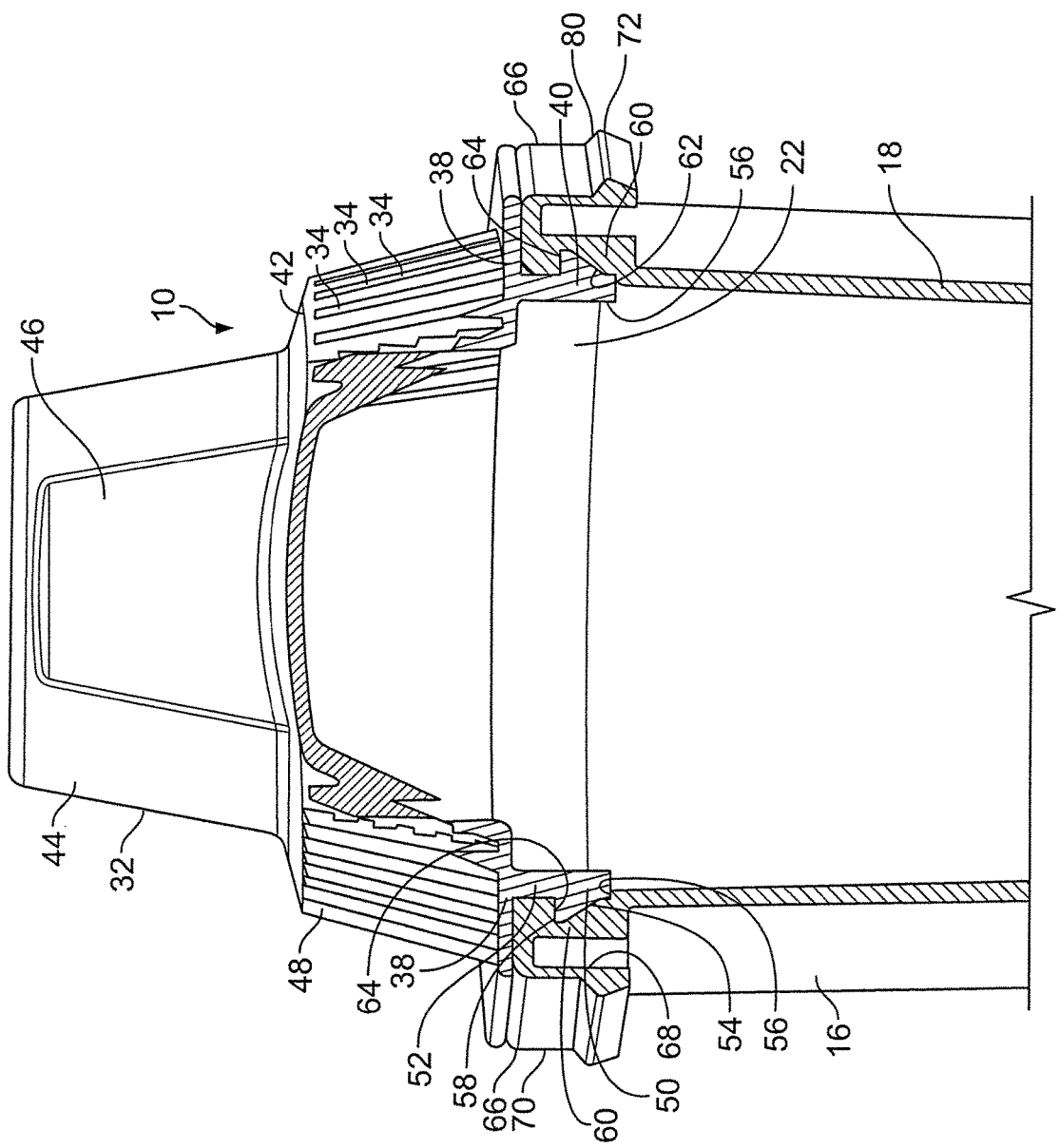
FIG. 2 is an enlarged, fragmentary vertical cross-section of the cartridge of FIG. 1.

Referring to FIGS. 1 and 2, the present water filter cartridge is generally designated 10, and is of the type used with conventional water pitcher filters. The present cartridge 10 is preferably disposable, and is dimensioned to operatively engage in a pitcher funnel 12. It is contemplated that the present cartridge 10 is operationally engageable in plurality of pitcher funnels known in the art, sourced by a variety of manufacturers. As is known in the art, the pitcher funnel 12 is disposed within an upper end of a water filter pitcher 14.

Figure 3:
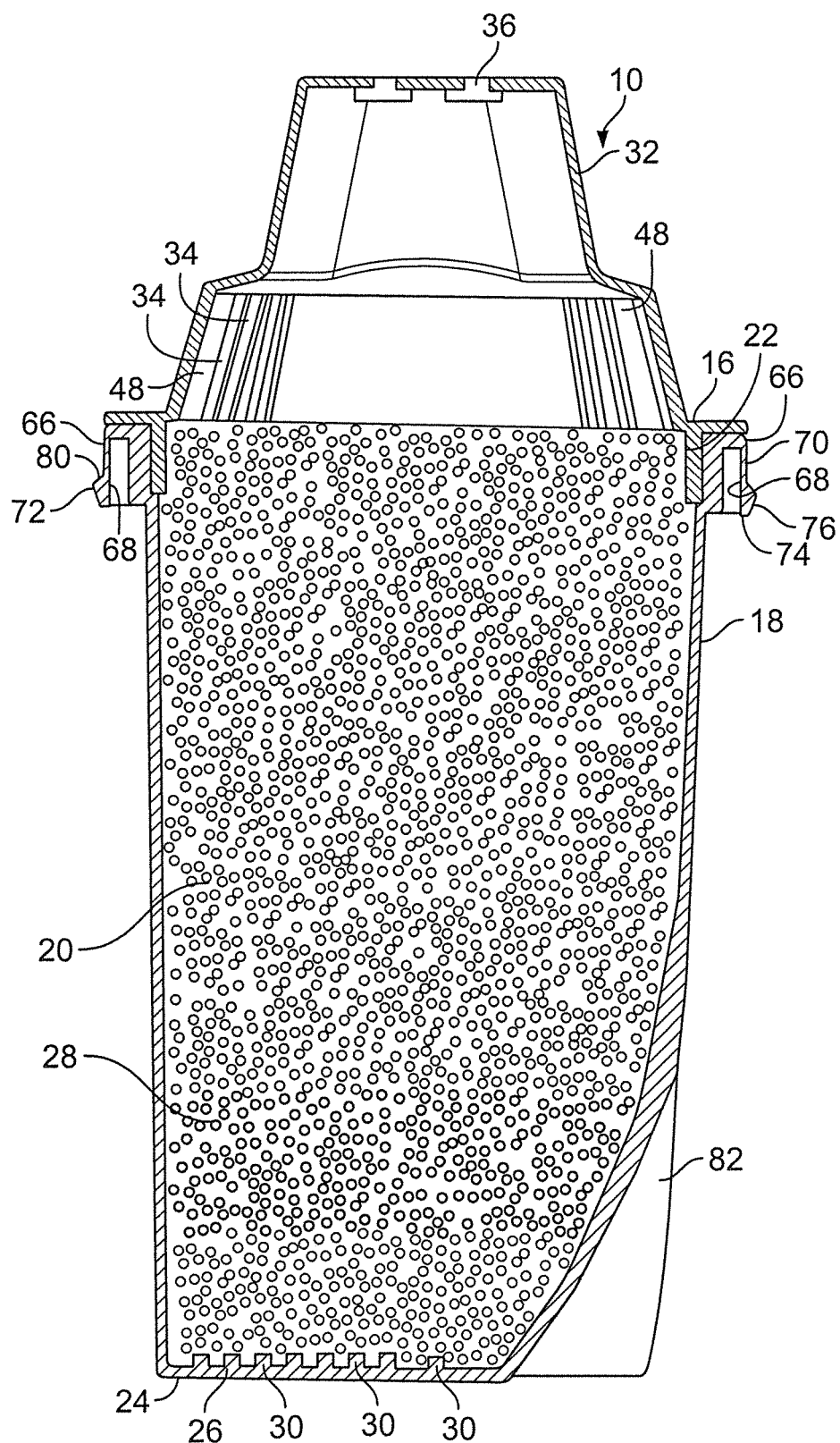
FIG. 3 is a vertical cross-section of the present filter cartridge shown with filter media.

In the cartridge 10, a housing, 16 is preferably made of injection molded plastic, however other materials are contemplated having structural rigidity, meeting National Sanitary Foundation (NSF) regulations for use with drinking water, and being relatively low cost. Included in the housing 16 is a body 18 defining an interior chamber 20, and the body having an open upper end 22 and a lower end 24 defining an outlet 26. As is known in the art, the interior chamber 20 of the body 18 is configured for accommodating a supply of filter media 28 (FIG. 3). The specific composition of the filter media 28 may vary to suit the situation, but in the preferred embodiment includes granulated activated carbon and ion exchange resin as the main ingredients. The outlet 26 includes a plurality of outlet openings 30. A feature of the present cartridge 10 is that the media 28 directly contacts the outlet 26, specifically on an inside surface 31 of the outlet, and as such the cartridge lacks any filter or screen for retaining the media, as is required in many conventional cartridges.

Figure 5:
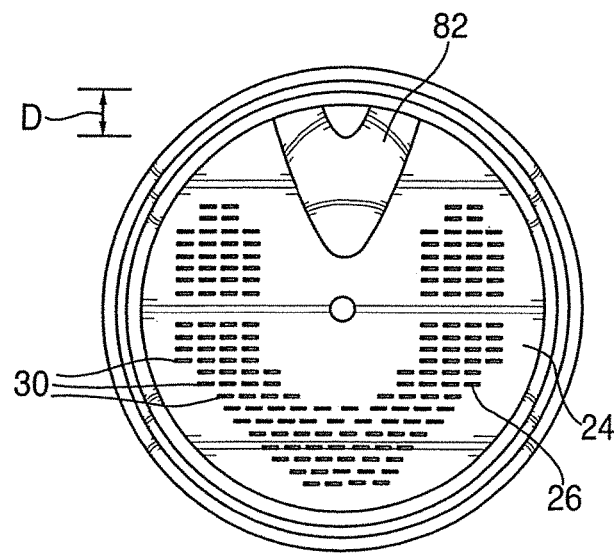
FIG. 5 is a bottom plan view of the present filter cartridge.

Referring now to FIGS. 1, 2 and 5, to prevent the escape of media 28 from the outlet 26, the media 28 is selected to have a size larger than the outlet openings 30. It is known in the art that the surface area of the filter media 28 is a factor in the ability to filter contaminants, with a larger surface area enhancing filter capacity. The smaller the mesh size of the media 28, the greater the surface area of the respective media particles. In the present embodiment, the preferred particle size of the granular carbon media 28 is 8×30 mesh (2.36-0.589 mm) and the preferred particle size of the ion exchange resin is 425-1180 microns (0.425-1.180 mm), and the size of the outlet openings 30 is such that each defines a 0.2×1.5 mm=0.3 square mm, since the openings are preferably rectangular in shape. Further, in the preferred embodiment, there are 88 openings 30; however the number and arrangement of the openings may vary to suit the situation, as long as satisfactory filtration is achieved, without allowing media particles to escape the outlet openings.

Referring now to FIGS. 1-4, also included in the housing 16 is a cap 32 configured for sealingly engaging the open upper end 22 of the body 18, and having at least one and preferably a plurality of inlet openings 34, as well as at least one vent opening 36. While it is contemplated that the shape of the cap 32 may vary to suit the application, in one embodiment, the cap is circular when viewed from above, has a radially projecting lip 38 at a lower cap end 40, an inlet portion 42 vertically displaced from the radial lip, and a vent portion 44 displaced farthest from the radial lip, and having the at least one vent opening 36. It is contemplated that the number and arrangement of vent openings 36 may vary to suit the application. In the depicted embodiment, each of the inlet portion 42 and the vent portion 44 defines successively smaller diameters compared to the radial lip 38, when viewed from above.

The vent portion 44 includes at least one gripping recess 46 (FIGS. 2 and 4) for facilitating removal of the cartridge 10 from the pitcher funnel 12 as is known in the art. Preferably there are two, diametrically opposed gripping recesses 46, however the number and arrangement may vary to suit the situation. It will be seen that the inlet openings 34 are provided in two, generally diametrically opposed zones 48 (FIGS. 2 and 3), however the number and arrangement of the openings may vary to suit the application. Referring now to FIG. 3, the media 28 is disposed in the interior chamber 20 such that incoming water entering the inlet openings 34 directly contacts the media, and does not pass through any interim structure, such as a screen or foam layer or the like.

Referring now to FIG. 2, another feature of the present cartridge 10 is that the cap 32 is secured to the body 18 solely by a snap fit connection. As such, conventional cartridge assembly techniques, such as sonic welding, chemical adhesives or the like, are dispensed with during assembly of the present cartridge 10. Instead, the cap 32 is provided with at least one and preferably a plurality of radially projecting gripping formations 50 located on a ring 52 depending from the radial lip 38. While the number, shape and disposition of the gripping formations 50 may vary to suit the application, the present formations 50 include an inclined locating surface 54 angling radially outwardly from a lower edge 56 of the ring 52. Connected to the locating surface 54 is a generally horizontally disposed locking surface 58 preferably located in spaced, parallel orientation relative to the radial lip 38. The gripping formations are preferably integrally molded with the cap 32, which with the body 18 is preferably molded of rigid, disposable plastic.

For engaging the cap 38 upon the body 18, the body is provided with at least one gripping receptacle 60, the number of such receptacles corresponding to the number of gripping formations 50. Each gripping receptacle 60 is dimensioned for tightly accommodating the corresponding gripping formation 50. Accordingly, the receptacle 60 includes an inclined landing 62 engaging the locating surface 54, and a generally horizontally disposed stop 64 with which the locking surface 58 contacts to seat the gripping formation 50 in place. The tight, friction-fit engagement between the gripping formation 50 and the receptacle 60 is such that, once the cap 38 is snapped upon the body 18, it cannot be manually removed without disfiguring or destroying at least one of the components.

Referring now to FIGS. 1 and 2, another feature of the present cartridge 10 is that it provides an enhanced water tight seal with the funnel 12, and preferably with a variety of configurations of funnels 12 produced by many conventional manufacturers. Accordingly, the upper end 22 of the body 18 is provided with a radially projecting seal flange 66. In the preferred embodiment, the seal flange 66 defines an inverted "U"-shape when viewed in vertical cross section (FIG. 2), with sides 68 of the "U"-shape being straight or planar and parallel to each other. Such straight sides 68 facilitate molding of the flange portion of the body 18.

Figure 4:
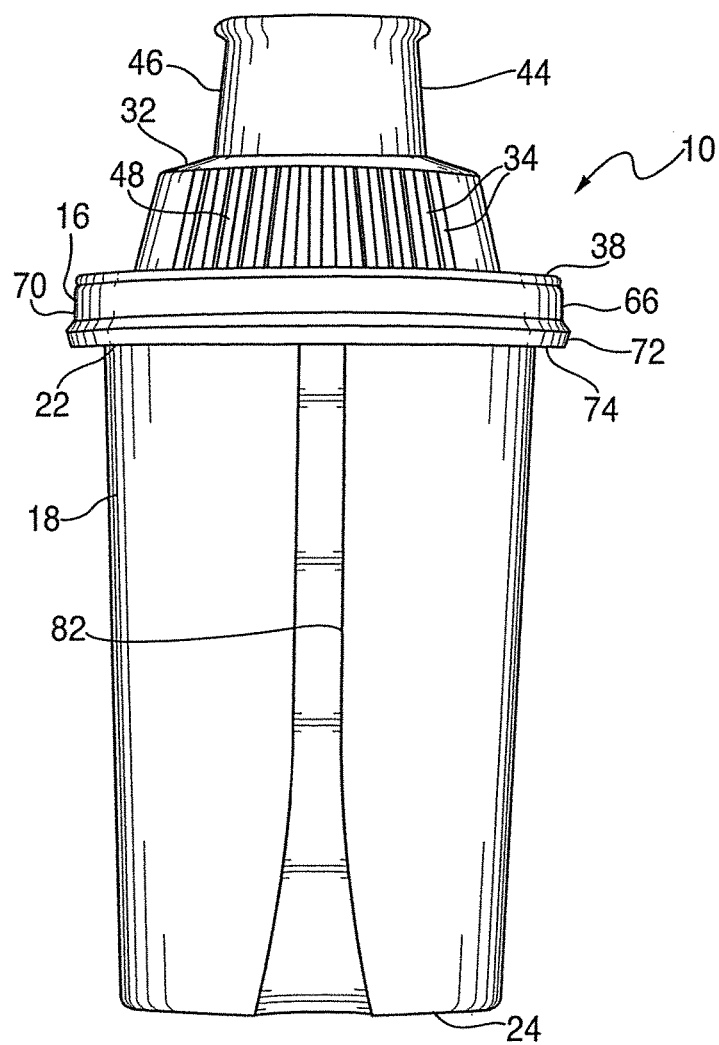
FIG. 4 is a front elevation of the present filter cartridge.

Referring now to FIGS. 2-4, an exterior surface 70 of the flange 66 is provided with an angular lobe 72 located adjacent a lower, free edge 74 of the exterior surface. The angular lobe 72 projects radially outwardly from the surface 70 and has an inclined seal surface 76 disposed for engaging an opening 78 (FIG. 1) on the funnel 12, and also has an annular top 80 connecting the seal surface to the exterior surface 70.

Referring now to FIGS. 4 and 5, another feature of the present cartridge 10 is that the body 18 has a locating groove 82 that extends from the lower end 24 to the upper end 22. The groove 82 is preferably dimensioned to have a depth "D" (FIG. 5) recessed inwardly from the body 18 to accommodate projections in selected funnels 12. While the depth "D" may vary to suit the application, in the preferred embodiment, it is approximately 3.5 mm. The depth "D" of the groove 82 is preferably determined by balancing a positive location in the funnel 12 with the corresponding loss of filtration media capacity.

Thus, it will be seen that the present filter cartridge 10 is more easily manufactured than conventional cartridges, in that the media 28 directly contacts the cartridge outlet 26 without requiring additional screens. A similar lack of any supplemental screen is found at the inlet openings 34 in the cap 32. Also, the present cap is retained on the body only by a snap-fit connection. Also, the seal flange 66 is more easily molded and at the same time more positively engages conventional funnels having a wide variety of dimensions than competitive cartridges.

While a particular embodiment of the present universal water filter cartridge has been shown and described, it will be appreciated by those skilled in the art that changes and modifications may be made thereto without departing from the invention in its broader aspects and as set forth in the following claims.

What is claimed:
1. A water filter cartridge, comprising:
a body having an outermost wall including a sidewall, an open upper end, and a single bottom wall, wherein said bottom wall is attached to and extends transverse to said sidewall, said bottom wall including an outlet having a plurality of unobstructed outlet openings, said openings extending from an interior of said body to an environment outside of the water filter cartridge, said sidewall having at least one gripping receptacle formed in an inner surface of said body, said at least one gripping receptacle including a generally horizontally disposed horizontal stop and an inclined landing extending from said stop, said body including a seal flange extending downwardly from said upper end of said body and spaced from said sidewall, said seal flange having an outer surface and a lobe extending outwardly from said outer surface;

a cap configured for sealingly engaging said sidewall at said upper end of said body, said cap having an outer surface and at least one gripping formation extending from said outer surface, said at least one gripping formation including an inclined locating surface and a generally horizontally disposed locking surface, wherein at least a portion of said outer surface of said cap fits within said sidewall of said body such that said locating surface and said locking surface of said at least one gripping formation correspondingly engage said landing and said stop of said at least one gripping receptacle to connect and lock said cap to said body solely by a snap-fit connection; and a supply of granulated media inserted in said body, the supply of granulated media directly contacting an inside surface of said outlet of said body; and said outlet openings being dimensioned for retaining the media despite direct contact with said inside surface of said outlet.

2. The cartridge of claim 1, wherein said cap has a plurality of inlet openings for receiving water for treatment.

3. The cartridge of claim 2, wherein said cap is generally circular when viewed from above, and said inlet openings are located diametrically apart from each other.

4. The cartridge of claim 1, further including 88 of said outlet openings, each defining an approximate 0.3 square mm area.

5. The cartridge of claim 1, said seal flange defining an inverted "U"-shape with said body with parallel inside surfaces defining said "U"-shape.

6. The cartridge of claim 5, wherein said lobe is an angular lobe on an exterior surface of said seal flange.

7. The cartridge of claim 6, wherein said lobe is located adjacent a free edge of said seal flange.

8. The cartridge of claim 1, further including a locating groove on said body extending from the lower end to the upper end.

9. A water filter cartridge, comprising:
a body configured for receiving a supply of filter media, said body having a top surface and a sidewall, said body further including an open upper end, a lower end, and a bottom wall, wherein said bottom wall is attached to and extends transverse to said sidewall, an outermost wall of said body including said sidewall and said bottom wall, said bottom wall including a mesh-free outlet having a plurality of outlet openings, said filter media being in direct contact with said outlet, said sidewall having at least one gripping receptacle formed on an inner surface of said body, said at least one gripping receptacle including a generally horizontally disposed horizontal stop and an inclined landing extending from said stop, said body including a seal flange extending downwardly from said upper end of said body and spaced from said sidewall, said seal flange having an outer surface and a lobe extending outwardly from said outer surface; and a cap configured for sealingly engaging said sidewall at said upper end of said body, said cap having a radially, outwardly projecting flange, a plurality of water inlet openings, and at least one vent opening, said cap having an outer surface and at least one projecting gripping formation extending from said outer surface, said at least one projecting gripping formation being vertically spaced from said flange and including an inclined locating surface and a generally horizontally disposed locking surface, wherein at least a portion of said outer surface of said cap fits within said sidewall of said body such that said flange engages said top surface of said body, and said locating surface and said locking surface of said at least one projecting gripping formation correspondingly engage said landing and said stop of said at least one gripping receptacle to connect and lock said cap to said body solely by a snap fit connection.

10. The cartridge of claim 9, further including a plurality of radially projecting gripping formations with an inclined locating surface and a generally horizontally disposed locking surface; and
said body has a plurality of gripping receptacles each dimensioned for receiving a corresponding one of said radially projecting gripping formations, and each said receptacle having a corresponding stop for receiving said corresponding locking surface in an opposing contacting relationship for obtaining said snap fit.

11. The cartridge of claim 9, further including a locating groove on said body extending from a bottom end to a top end.

12. A water filter cartridge, comprising:
a body having a top surface and an outermost wall having a sidewall, said body further including an open upper end, a lower end, and a single bottom wall, wherein said bottom wall is attached to and extends transverse to said sidewall, said bottom wall including a mesh-free outlet having a plurality of outlet openings formed in said body, said openings extending from an interior of said body to an environment outside of the water filter cartridge, said sidewall having at least one gripping receptacle formed in an inner surface of said body, said at least one gripping receptacle including a generally horizontally disposed horizontal stop and an inclined landing extending from said stop;

a cap configured for sealingly engaging said sidewall at said upper end of said body, said cap having a radially, outwardly projecting flange, a plurality of water inlet openings and at least one vent opening, said cap further having an outer surface and at least one projecting gripping formation extending from said outer surface, said at least one projecting gripping formation being vertically spaced from said flange, and including an inclined locating surface and a generally horizontally disposed locking surface, wherein at least a portion of said outer surface of said cap fits within said sidewall of said body such that said flange engages said top surface of said body, and said locating surface and said locking surface of said at least one projecting gripping formation correspondingly engage said landing and said stop of said at least one gripping receptacle to connect and lock said cap to said body solely by a snap fit connection;

a seal flange radially projecting from an upper end of said body and being spaced from said sidewall, said seal flange defining an inverted "U"-shape with said body with parallel inside surfaces defining said "U"-shape, and having an angular lobe extending outwardly from an exterior surface of said seal flange; and a supply of granulated filter media inserted in said body, said granulated filter media directly contacting an inside surface of said outlet of said body.

13. The cartridge of claim 12, wherein said lobe is located adjacent a free edge of said seal flange.

14. The cartridge of claim 12, further including a locating groove on said body extending from a bottom end to a top end.

* * * * *